United States Patent
Nunn

(10) Patent No.: US 10,415,501 B2
(45) Date of Patent: Sep. 17, 2019

(54) METHOD AND APPARATUS FOR GENERATING ELECTRICITY UTILIZING HEAT FROM ENCLOSED FLARES AND OTHER COMBUSTORS

(71) Applicant: TriStar Technology, LLC, Carencro, LA (US)

(72) Inventor: James W. Nunn, Carencro, LA (US)

(73) Assignee: TriStar Technology, LLC, Carencro, LA (US)

(*) Notice: Subject to any disclaimer, the term of this patent is extended or adjusted under 35 U.S.C. 154(b) by 0 days.

(21) Appl. No.: 16/146,309

(22) Filed: Sep. 28, 2018

(65) Prior Publication Data

US 2019/0101079 A1    Apr. 4, 2019

(51) Int. Cl.
| | |
|---|---|
| *F02G 1/043* | (2006.01) |
| *F02G 1/053* | (2006.01) |
| *F02G 1/055* | (2006.01) |

(52) U.S. Cl.
CPC ............ *F02G 1/043* (2013.01); *F02G 1/053* (2013.01); *F02G 1/055* (2013.01); *F02G 2254/15* (2013.01); *F02G 2255/00* (2013.01); *F02G 2280/20* (2013.01)

(58) Field of Classification Search
CPC .. F02G 1/043; F02G 2243/02; F02G 2243/04; F02G 2280/10; F05C 2225/08
See application file for complete search history.

(56) References Cited

U.S. PATENT DOCUMENTS

| | | | | |
|---|---|---|---|---|
| 8,250,869 B2* | 8/2012 | Sawada | ................... | F02G 1/043 60/516 |
| 8,726,661 B2* | 5/2014 | Spicer | .................... | F02G 1/043 60/299 |
| 2002/0017098 A1* | 2/2002 | Johansson | ............... | F02G 1/043 60/517 |
| 2003/0163990 A1* | 9/2003 | Maceda | .................. | F02G 1/043 60/517 |
| 2010/0275591 A1* | 11/2010 | Hammerman | .......... | F02G 1/043 60/516 |
| 2011/0000407 A1* | 1/2011 | Bassett | ..................... | F01K 7/36 110/238 |
| 2013/0269343 A1* | 10/2013 | Kobylecky | ............... | F01N 5/02 60/615 |

* cited by examiner

*Primary Examiner* — Mark A Laurenzi
*Assistant Examiner* — Shafiq Mian
(74) *Attorney, Agent, or Firm* — Ted M. Anthony

(57) ABSTRACT

A system for electricity generation using heat contained in exhaust gas from a combustor (enclosed flare) to drive an external combustion Stirling cycle engine which directly drives at least one alternator or generator. A battery is connected to the alternator or generator through a divider circuit followed by a filter circuit. Electric power distribution circuits are electrically connected to output circuits of the alternators or generators for consumption of the electric power on-site, for sale to a commercial electric power distribution grid, or for any other desired uses.

16 Claims, 3 Drawing Sheets

METHOD AND APPARATUS FOR GENERATING ELECTRICITY UTILIZING HEAT FROM ENCLOSED FLARES AND OTHER COMBUSTORS

CROSS REFERENCES TO RELATED APPLICATION

This application claims priority of U.S. Provisional Patent Application Ser. No. 62/565,537, filed Sep. 29, 2017, incorporated herein by reference.

STATEMENTS AS TO THE RIGHTS TO THE INVENTION MADE UNDER FEDERALLY SPONSORED RESEARCH AND DEVELOPMENT

None

BACKGROUND OF THE PRESENT INVENTION

1. Field of the Invention

The present invention pertains to an electric power generation system. More particularly, the present invention pertains to a method and apparatus for generating electricity utilizing heat produced from the burning of hydrocarbons or "waste gas" in combustors.

2. Description of Related Art

Conventional combustion assemblies—also commonly referred to as "combustors" or "enclosed flares"—are well known in the art. Such conventional combustor systems are used in a wide variety of applications and are generally used to burn off excess gas, usually hydrocarbons. Conventional combustors are generally distinguishable from open flame flares, which are typically thin and very tall to allow clearance for an open flame to burn high above any surrounding equipment, property or personnel.

By contrast, conventional combustors are generally much shorter and have wider diameters than open flame flares. Such conventional combustors typically comprise combinations of combustion chambers (where the actual combustion or burning occurs) and substantially vertical exhaust or ventilation stacks used to vent hot gases generated by such burning. Conventional combustors are used in a wide variety of different applications including, without limitation, to burn hydrocarbons in industrial settings such as ocean going oil tanker and oil barge transshipment terminals, petroleum refineries, chemical plants, natural gas processing plants, as well as onshore and offshore hydrocarbon production facilities. By way of illustration, but not limitation, John Zink Hamworthy Combustion manufactures and installs marine combustor assemblies; such conventional marine combustors can include ventilation stacks measuring over sixty-five (65) feet tall and twelve (12) feet in diameter, with heat throughput of 175 megawatts (MW) or more.

Typically, such combustor assemblies receive hydrocarbon waste or flare gas and utilize intense heat (1,650 degrees Fahrenheit or more) to burn off toxic hydrocarbon gases before combustion products, primarily water vapor ($H_2O$) and carbon dioxide ($CO_2$), are released into the atmosphere through ventilation or exhaust stacks. The combustion process can burn such toxic hydrocarbon gases with a destruction efficiency of 99.99%. In many instances, such destruction efficiency is mandated by applicable laws, rules and/or governing regulations, and must be expressly set forth in facility operating permits (see, for example, 40 CFR 264.343 (a)(1)).

Such conventional combustor assemblies are particularly effective at burning toxic gases; however, the combustion process inevitably results in relatively large volumes of heated exhaust gases that must be released through ventilation or exhaust stacks. As such, large amounts of heat energy (sometimes in the hundreds of megawatts range) are released into the surrounding environment through such vented exhaust gases. In such cases, the heat energy of said exhaust gases remains largely untapped and unused. Further, there is currently no efficient or reliable means for capturing or using said heat energy from said combustor assemblies in order to generate electricity or any other beneficial source of power.

In view of the foregoing, there is a need for a system for beneficially capturing and converting the abundant heat energy from exhaust gases emitted from a conventional combustor assembly in order to generate electricity. Said electricity can be used to power on-site equipment and operations (i.e., in the general vicinity of said combustion assembly) and/or transmitted to a distant location such as via a commercial electric power distribution grid.

SUMMARY OF THE INVENTION

The present invention comprises a method and apparatus for utilizing intense heat emitted from the exhaust vent(s) of conventional combustion assemblies (also sometimes referred to as an enclosed flare) in order to generate electricity. In a preferred embodiment, the power generation assembly of the present invention generally comprises some combination of the following basic components: a Stirling cycle engine, an electrically driven engine starter, at least one electricity generator or alternator, a voltage divider circuit, at least one battery, a data transmission panel, a data monitoring panel, an external electrical power distribution controller, a heat shield (typically disposed between other components of the present invention and hot exhaust gas expelled from said conventional combustion assembly), and a plurality of temperature sensors.

Generally, an engine-generator or "gen-set" comprises a combination of an electrical generator or alternator and an engine (prime mover) mounted together to form a single piece of equipment. In many contexts, the engine is not specifically referenced, and the combined unit is simply called a generator. Said engine-generators are available in a wide range of sizes and power ratings. Regardless of the size, generators may run on gasoline, diesel, natural gas, propane, bio-diesel, water, sewage gas or hydrogen. Most of the smaller units are built to use gasoline (petrol) as a fuel, and the larger ones have various fuel types, including diesel, natural gas and propane (liquid or gas). Some engines may also operate on diesel and gas simultaneously (bi-fuel operation).

In the present case, said Stirling engine further comprises an output shaft operationally attached to said at least one alternator or generator; the Stirling engine acts as an engine or prime mover. Electricity generated by said generator or alternator is distributed at an output node. Said divider circuit comprises a current divider circuit and a voltage divider circuit, and is electrically connected to an output node of said generator or alternator. Said battery is connected to said generator or alternator through the divider circuit followed by a filter circuit.

The power generation assembly of the present invention can be mounted to or otherwise installed on a support platform and is beneficially positioned at a level at or near the upper end—and outlet—of the combustor exhaust stack or vent. In this position, a plurality of heater tubes of said Stirling engine can directly contact exhaust gas exiting the top of the combustion assembly. A baffle (typically constructed of sheet metal or other similar material) of one or more layers may be used to direct the flow of hot exhaust gases to contact the heater tubes of the Stirling engine.

In a preferred embodiment, the power generation assembly of the present invention is capable of producing an output power of at least 20 KVA. Additionally, the voltage divider circuit limits a required charging current and voltage to the battery pack and distributes any extra electrical power produced by the generator for use on-site, and/or for transmission to a larger electric power grid.

The power generation assembly of the present invention also comprises a transmission panel and a remote monitoring panel. The transmission panel can be beneficially mounted to the support platform and can record operational data regarding the electric generator, the voltage divider circuit, the battery and the external power distribution controller. The monitoring panel receives data transmitted from the transmission panel. Further, the transmission panel sends monitored data from the electric generator/alternator, the voltage divider circuit, the battery pack and the external power distribution controller to the monitoring panel in real time. Alternatively, the transmission panel can record and store such monitored data for later transmission or downloading.

In a preferred embodiment, the monitoring panel provides an interface for real-time control of various components of said power generation assembly including, without limitation, the electric generator/alternator, the divider circuit, the battery and/or the external power distribution controller, either through an autonomous computer readable program or manual control. Said components can work in dependent relationship, or independently from each other, as desired.

By way of illustration, but not limitation, the power generation assembly of the present invention can be permanently installed in order to generate electricity from heat energy from large combustor assemblies (and, more particularly, the exhaust gases vented therefrom) utilized to burn hydrocarbons in refineries, natural gas processing plants or other locations such as, for example, Marine Vapor Control Units (MVCU) in oil transshipment terminals or other similar installations. In this embodiment there is no requirement for the present invention to capture, compress or process any hydrocarbon waste gas or "flare gas"; rather, electricity is generated using heat produced by burning the waste gas in said combustion assembly.

Thus, it is an object of the present invention to provide a system for using abundant heat energy from exhaust gases from a combustion assembly to generate electricity. Further, it is also an object of the present invention to convert heretofore lost heat energy into a financial asset or revenue stream to an owner of said combustor assembly.

BRIEF DESCRIPTION OF THE DRAWINGS

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

Figure 1:
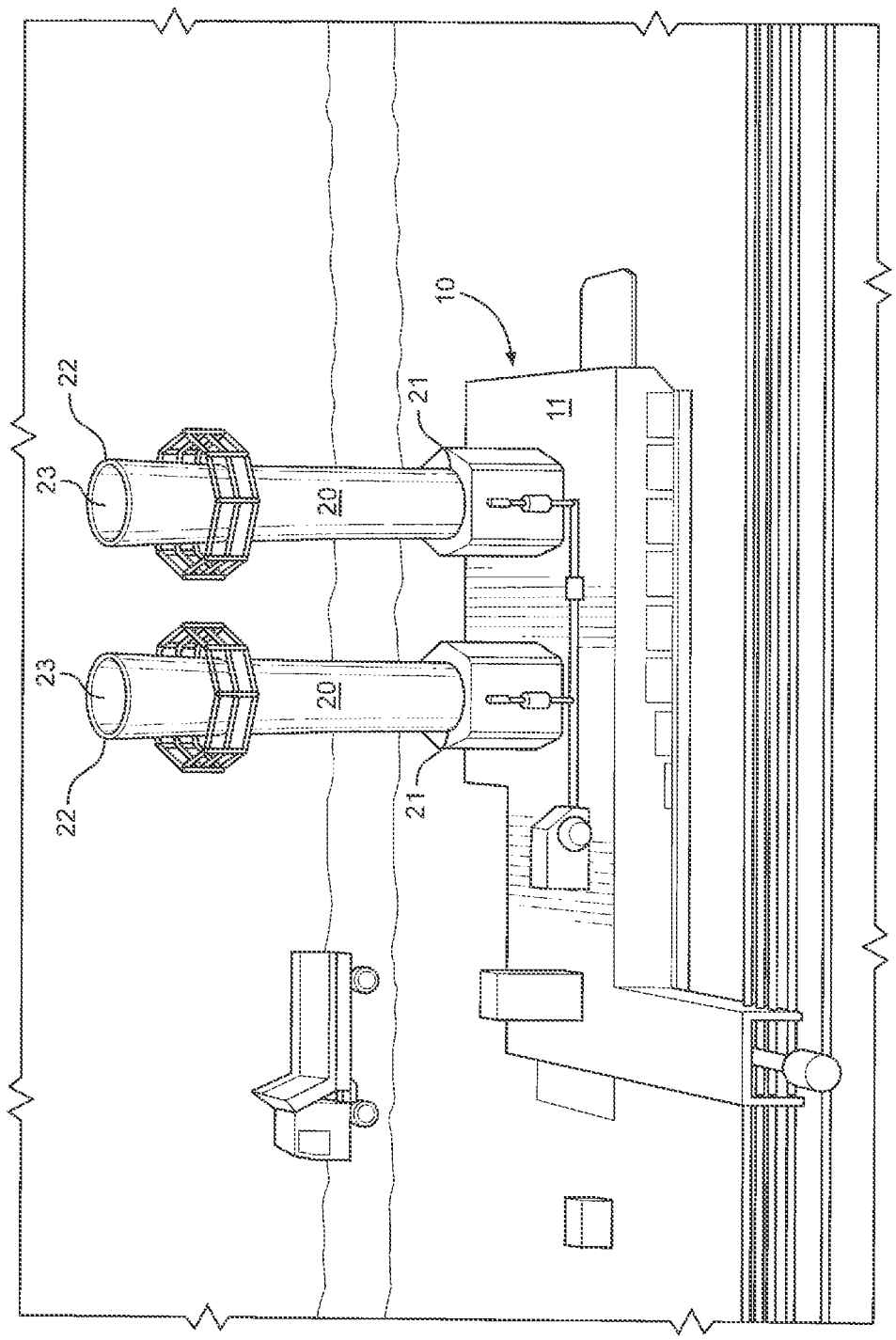
FIG. 1 depicts an overhead perspective view of a conventional combustor assembly.

FIG. 1 depicts an overhead perspective view of a conventional combustor assembly 10. In the embodiment depicted in FIG. 1, said conventional combustor assembly 10 reflects a representative combustor design, such as commonly installed and used at oil tanker and oil barge transshipment terminals. However, it is to be observed that combustor assembly 10 could embody any number of alternative designs that could be used in many different applications without departing from the scope of the present invention.

Still referring to FIG. 1, conventional combustor assembly 10 comprises at least one combustion chamber apparatus 21, wherein gases to be burned are consumed in the combustion process. Typically, said at least one combustion chamber apparatus 21 receives hydrocarbon gases and utilizes intense heat (1,650 degrees Fahrenheit or more) to burn off said toxic hydrocarbon gases. In some cases, natural gas or other fuel is supplied to said combustion chamber apparatus 21 in order to improve the burning process and ensure destruction efficiency of such combustion operations.

Combustor assembly 10 further comprises substantially vertical exhaust or ventilation stacks 20, each having a base or lower end 21, an upper end 22, and a central through bore 23 extending there through. Said ventilation stacks 20 are used to vent hot gases generated by the burning process conducted in combustion chamber apparatus 21. Following such combustion, resulting products of such combustion (which typically comprise primarily water vapor ($H2O$) and carbon dioxide ($CO2$)) are released into the atmosphere as exhaust gases through central through bores 23 of ventilation stacks 20.

The aforementioned combustion process results in large volumes of heated exhaust gases that pass through ventilation stacks 20 (and, more particularly, through bores 23 thereof). Thereafter, said exhaust gases are emitted from said ventilation stacks 20 into the surrounding environment. In this process, large amounts of heat energy (sometimes in the scores of megawatts range) are released into the atmosphere through such exhaust gases.

Figure 2:
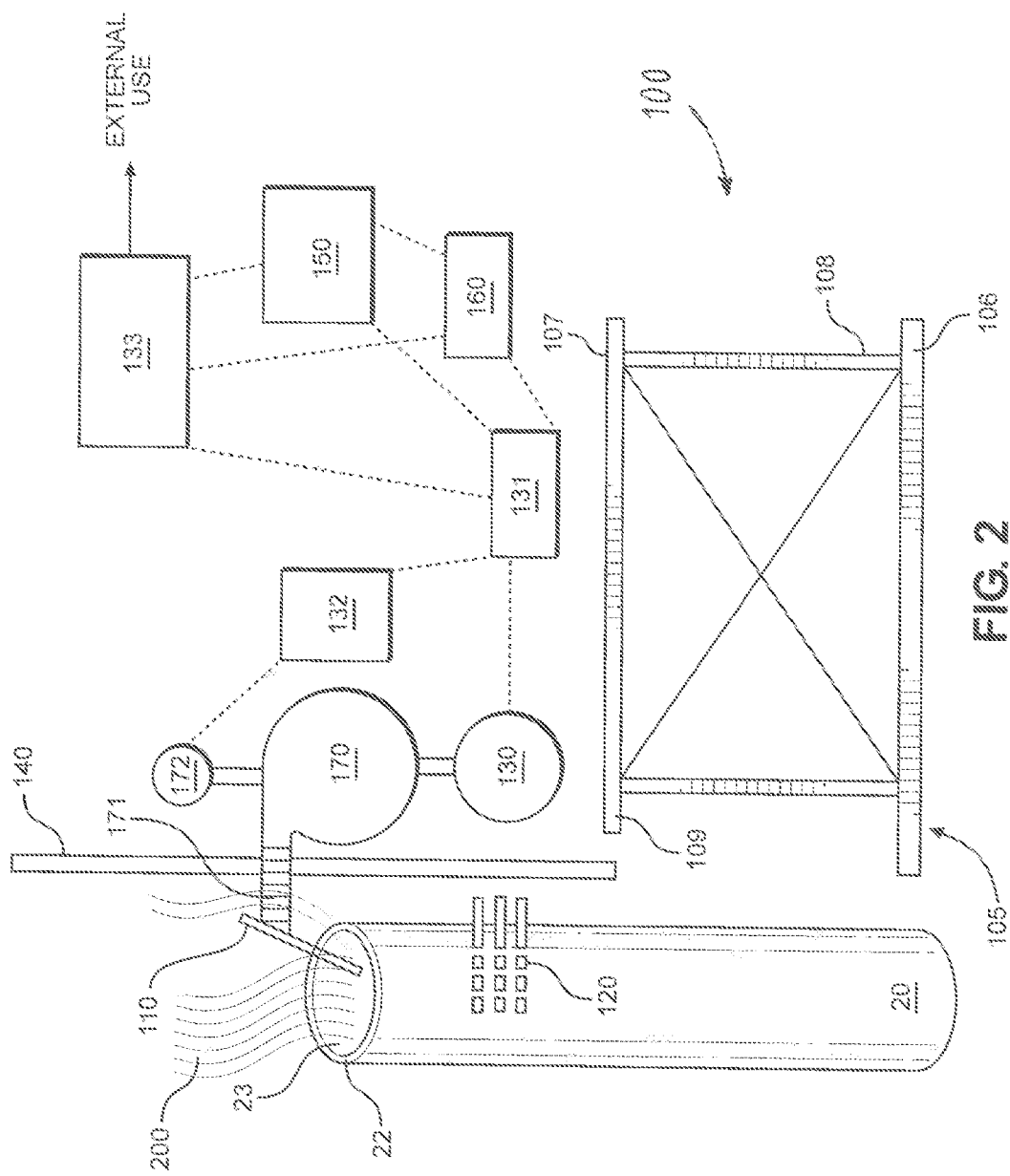
FIG. 2 depicts a diagrammatic view of a preferred embodiment of power generation assembly of the present invention.

FIG. 2 depicts a diagrammatic view of a preferred embodiment of power generation assembly 100 of the present invention. In a preferred embodiment, and as more fully described in detail herein, said power generation assembly 100 of the present invention can be beneficially installed and positioned in close proximity to substantially vertical combustor ventilation stack 20 and, more specifically, heated exhaust gases 200 released from central through bore 23 of said ventilation stack 20.

As depicted in FIG. 2, said power generation assembly 100 can be beneficially disposed on a support platform 105. Although the specific configuration of said support platform 105 can vary without departing from the scope of the present invention, as depicted in FIG. 2, said support platform 105 further comprises a base 106, upper support member 107 having upper surface 109 and at least one support leg member 108 disposed between base 106 and upper support member 107. Power generation assembly 100 and/or component parts thereof can be beneficially positioned on upper surface 109 of platform 105 so as to position said power generation assembly 100 in proximity to upper end 22 of combustor ventilation stack 20. Said power generation assembly 100 of the present invention further comprises Stirling engine 170 (also sometimes referred to as a Stirling cycle engine) having at least one exposed heater tube 171.

Figure 3:
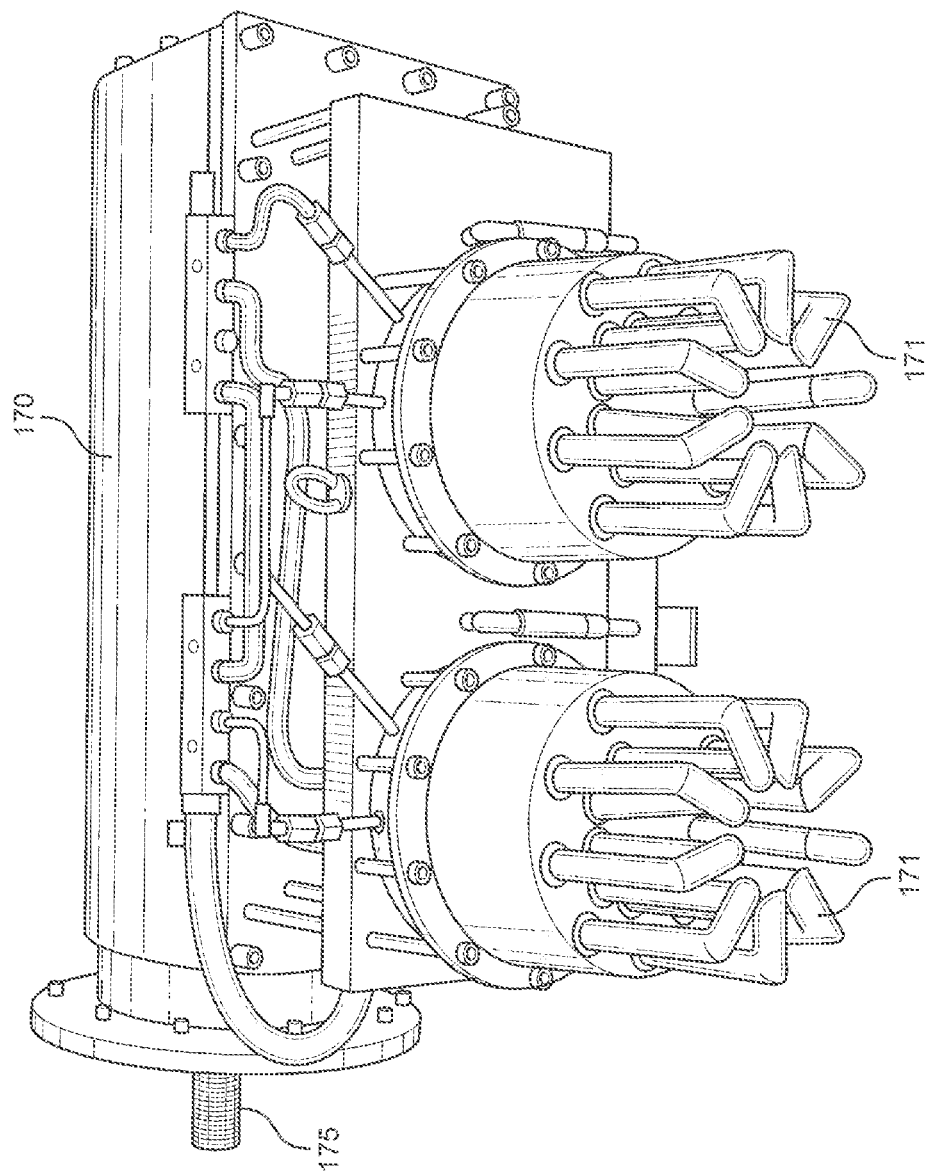
FIG. 3 depicts a perspective view of a Stirling engine having closed cycle internal working fluid with heater tubes.

FIG. 3 depicts a perspective view of a conventional Stirling engine 170 having at least one heater tube 171 well known to those having skill in the art. In a preferred embodiment, said Stirling engine 170 contains a closed cycle internal working fluid (typically of constant mass) within a cylinder; said fluid expands when heated and contracts when cooled, thereby pushing a piston within said cylinder with alternating force. Said piston displacement powers mechanical output, such as a rotatable drive shaft 175 depicted in FIG. 3. Said Stirling engine 170 further comprises at least one heater tube 171 that can be beneficially exposed to an external heat source in order to aid in the transfer of heat energy to internal working fluid contained within said Stirling engine 170 in order to actuate said Stirling engine 170.

Stirling engine 170 can further comprise a "regenerator" that is a heat storage device through which the internal working fluid flows from the heat source to the cylinder, and back again through the regenerator from the cylinder to the heat source. Modern materials science has produced high heat capacity, dense, strong yet very porous regenerator materials well known to those having skill in the art. Further, in a preferred embodiment, each downward or expansion stroke by said piston of said Stirling engine 170 is a power stroke similar to a two-cycle internal combustion engine; however, lubricants and internal components of said Stirling engine 170 are not exposed to the by-products or heat of combustion as in an internal combustion engine.

It is to be observed that Stirling engine 170 may, alternatively, have drive shaft 175 exposed on two sides of said Stirling engine 170 so that one or more alternators or generators can be attached to and driven by both ends of said drive shaft 175. Stirling engine 170 is substantially quieter than an internal combustion engine because no internal "combustion explosions" take place during the operation of said Stirling cycle engine 170.

Referring back to FIG. 2, said at least one heater tube 171 of said Stirling engine 170 can be beneficially positioned to contact heated exhaust gases 200 emitted from central through bore 23 of combustor ventilation stack 20 at or near upper end 22 of said stack 20. A diverter baffle member 110 (typically constructed of sheet metal or other similar material having desired characteristics) having one or more layers or plies can be beneficially positioned relative to said central through bore 23 in order to divert or re-direct flow of some or all of said hot exhaust gases 200 in order to contact said at least one heater tube 171 of said Stirling engine 170. At least one heat shield 140 having desired heat insulation properties protects components of power generation assembly 100 from intense heat of exhaust gases 200.

In operation, heat energy from exhaust gases 200 is transferred to at least one heater tube 171 of Stirling engine 170, and working fluid thereof, in order to function or actuate said Stirling engine 170. Said Stirling engine 170, in turn, generates mechanical output via drive shaft 175 which, in turn, is operationally attached to alternator 130. Put another way, said drive shaft 175 of said Stirling engine 170 transfers said mechanical output (typically torque forces) to a drive shaft of an alternator 130.

In a preferred embodiment, said alternator 130 generally comprises an electrical generator that converts mechanical energy to electrical energy (electricity) in the form of alternating electrical current. For reasons of cost and simplicity, many conventional alternators use a rotating magnetic field with a stationary armature. On the other hand, the armature winding of wire in a generator spins inside a fixed magnetic field to generate electricity. By way of illustration, but not limitation, said alternator 130 can comprise a 400 KW 433CSL6216j Generator Alternator 500 KVA 3 Phase marketed by Marathon Electric, or other alternator having desired characteristics.

Said alternator 130 electrically connected to a voltage divider 131 that monitors any loads on said alternator 130; said voltage divider 131 is electrically connected to an electrical divider circuit comprising a battery 132 and a starter 172 for Stirling engine 170. Said electrical divider circuit further comprises a current divider circuit and a voltage divider circuit. The divider circuit is electrically connected to an output node of said alternator 130, while said battery 132 is electrically connected to said alternator 130 and electric starter 172 through said divider circuit, followed by a filter circuit. Voltage divider 131 limits or restricts a required charging current and voltage to battery 132, and distributes any extra electricity produced by alternator 130 for use or storage.

In a preferred embodiment, said power generation assembly 100 further comprises a data control (transmission) panel 150 and a remote monitoring panel 160. Said data control transmission panel 150 can be beneficially mounted on or around support platform 105 and can monitor and record operational data regarding components of said power generation assembly 100 including, without limitation, electric alternator 130, voltage divider 131, battery 132 and/or external power distribution controller 133 using data sensors well known in the art. Said operational data monitored and/or recorded by panel 150 can be transmitted to monitoring panel 160.

In a preferred embodiment, said monitoring panel 160 is located a desired distance away from power generation assembly 100 and/or hot exhaust gases 200, and receives data transmitted from panel 150 through either wired or wireless transmission. Further, transmission panel 150 can beneficially transmit monitored data (including, without limitation, regarding electric alternator 130, voltage divider 131, battery 132 and external power distribution controller 133, as well as temperature sensors 120 for sensing and/or measuring temperature of exhaust gases 200) to monitoring panel 160 in real time.

In a preferred embodiment, temperature sensors 120 extend into an upper portion (for example, the upper ten percent) of a combustor stack 20. Sensed data from sensor 120 is transmitted to panel 150; such sensed data can include, without limitation, confirmation whether said combustor is operating, as well as operating conditions for said combustor stack 20. Panel 150 can transmit said sensed data to panel 160, or record and store such sensed data for later transmission or downloading.

Further, monitoring panel 160 also provides an interface for real-time control of various components of said power generation assembly 100 including, without limitation, electric alternator 130, voltage divider 131, battery 132 and external power distribution controller 133, either through an autonomous computer readable program or manual input/ control. Said components can work in dependent relationship, or independently from each other, as desired.

In a preferred embodiment, panel 150 can be beneficially electrically connected to at least one electro-mechanical actuator which can be used to control components of power generation assembly 100 including, without limitation, electric alternator 130, voltage divider 131, battery 132 external power distribution controller 133 and/or temperature sensors 120. The electromechanical actuators are controlled through a command code sent from monitoring panel 160 via panel 150 during a manual control operation.

For automated control operation, a pre-stored computer readable program (software) operating in conjunction with a computer processor can measure and interpret operational data monitored and recorded, and/or sent, via panel 150. Said computer program can automatically adjust operating parameters of components of said power generation assembly 100 to meet predetermined working condition standards, typically in real time. Said predetermined working condition standards can be based on reference data or any other desired criteria, and any deviation from said predetermined standards can automatically initiate an alarm mode. In such cases, said processor and program can beneficially control operation of said actuators until operation of said power generation assembly 100, and/or components thereof, are within said predetermined standards.

By way of illustration, but not limitation, power generation assembly 100 of the present invention can be permanently installed in order to generate electricity from heat energy from large combustor assemblies (and, more particularly, the exhaust therefrom) utilized to burn hydrocarbons in refineries, natural gas processing plants or other locations such as, for example, Marine Vapor Control Units (MVCU) in oil transshipment terminals or other similar installations as depicted in FIG. 1. Importantly, in a preferred embodiment, there is no requirement that power generation assembly 100 capture, compress or process hydrocarbon waste gas or "flare gas"; rather, electricity is generated using heat produced by burning the waste gas in said combustor assembly.

The present system provides electric power generation from the intense heat (1,650 degrees F.) contained in the exhaust gases emitted from combustors. The present system also provides electric power for onsite consumption, for sale to an external or commercial electrical power grid, or for other uses. Notwithstanding the preferred embodiment described herein, it is to be observed that power generation assembly 100 can be mounted in and/or on combustor ventilation stack 20 (and can contact heated exhaust gases 200) other than at upper end 22 of said stack 20, without departing from the scope of the present invention.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A power generation apparatus for using the heat from exhaust gases a combustor flare or enclosed to generate electricity comprising:

a) at least one electric alternator configured to produce electrical current and having an output node;
   b) a Stirling engine configured to drive said at least one alternator;
   c) a platform for supporting said Stirling engine and said at least one alternator, wherein said Stirling engine is exposed to heat from said exhaust gases in order to actuate said Stirling engine; and
   d) a divider circuit electrically connected to said output node of said at least one alternator, wherein said divider circuit comprises a current divider circuit and a voltage divider circuit; and
   a battery electrically connected to said divider circuit; and
   an electric starter electrically connected to said battery and said Stirling engine.

2. The power generation apparatus of claim 1, wherein said divider circuit limits charging current and voltage from said at least one alternator to said battery, and distributes any remaining electric power generated from at least one alternator to an external power grid.

3. The power generation apparatus of claim 1, further comprising at least one heat shield at least partially disposed between said exhaust gases and said power generation apparatus, wherein said at least one heat shield is configured to protect said power generation apparatus from heat energy of said exhaust gases.

4. The power generation apparatus of claim 3, wherein said at least one heat shield comprises insulated metal.

5. The power generation apparatus of claim 1, further comprising at least one heat sensor configured to measure heat of said exhaust gases.

6. The power generation apparatus of claim 1, further comprising at least one baffle configured to redirect flow of said exhaust gases toward heater tubes of said Stirling engine.

7. The power generation apparatus of claim 1, further comprising a data control panel configured to record and display operational data regarding said Stirling engine, said at least one electric alternator, said divider circuit or said battery.

8. The power generation apparatus of claim 7, further comprising a data monitoring panel configured to receive operational data transmitted from said data control panel, and display said transmitted operational data.

9. A method for using heat from exhaust gases from a combustor or enclosed flare to generate electricity comprising:

a) positioning a power generation apparatus in proximity to a ventilation stack of said combustor or enclosed flare containing exhaust gases, wherein said power generation apparatus further comprises:
      i) at least one electric alternator configured to produce electrical current and having an output node;
      ii) a Stirling engine configured to drive said at least one alternator; and
      iii) a platform for supporting said Stirling engine and said at least one alternator;
   b) exposing said Stirling engine to heat from said exhaust gases;
   c) actuating said Stirling engine;
   d) generating electricity from said at least one alternator; and
   e) a divider circuit electrically connected to said output node of said at least one alternator, wherein said divider circuit comprises a current divider circuit and a voltage divider circuit; and a battery electrically connected to said divider circuit; and
an electric starter electrically connected to said battery and said Stirling engine.

10. The method of claim 9, wherein said divider circuit limits charging current and voltage from said at least one alternator to said battery, and distributes any remaining electric power generated from at least one alternator to an external power grid.

11. The method of claim 9, further comprising at least one heat shield at least partially disposed between said exhaust gases and said power generation apparatus, wherein said at least one heat shield is configured to protect said power generation apparatus from heat energy of said exhaust gases.

12. The method of claim 11, wherein said at least one heat shield comprises insulated metal.

13. The method of claim 9, further comprising at least one heat sensor configured to measure heat of said exhaust gases.

14. The method of claim 9, further comprising at least one baffle configured to redirect flow of said exhaust gases toward heater tubes of said Stirling engine.

15. The method of claim 9, further comprising a data control panel configured to record and display operational data regarding said Stirling engine, said at least one electric alternator, said divider circuit or said battery.

16. The method of claim 15, further comprising a data monitoring panel configured to receive operational data transmitted from said data control panel, and display said transmitted operational data.

* * * * *